(No Model.)
N. A. DURHAM.
COFFEE ROASTER.
No. 389,454. Patented Sept. 11, 1888.
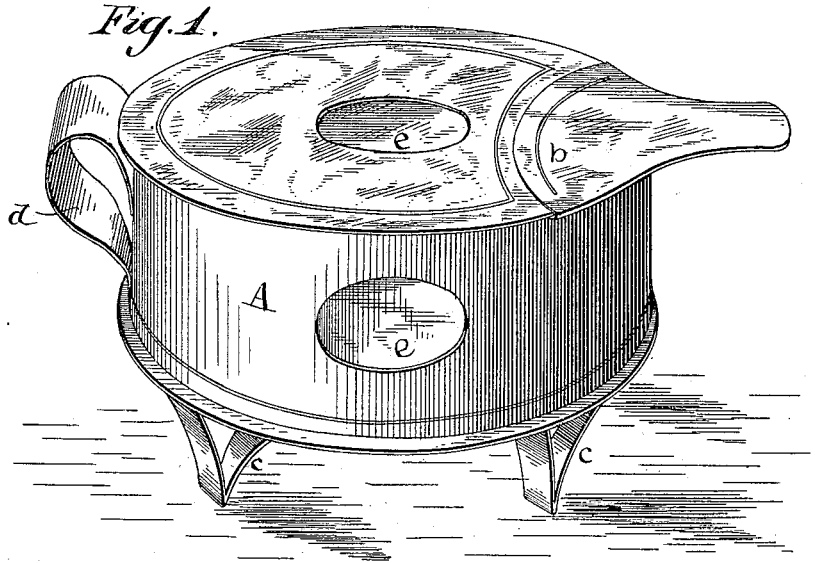
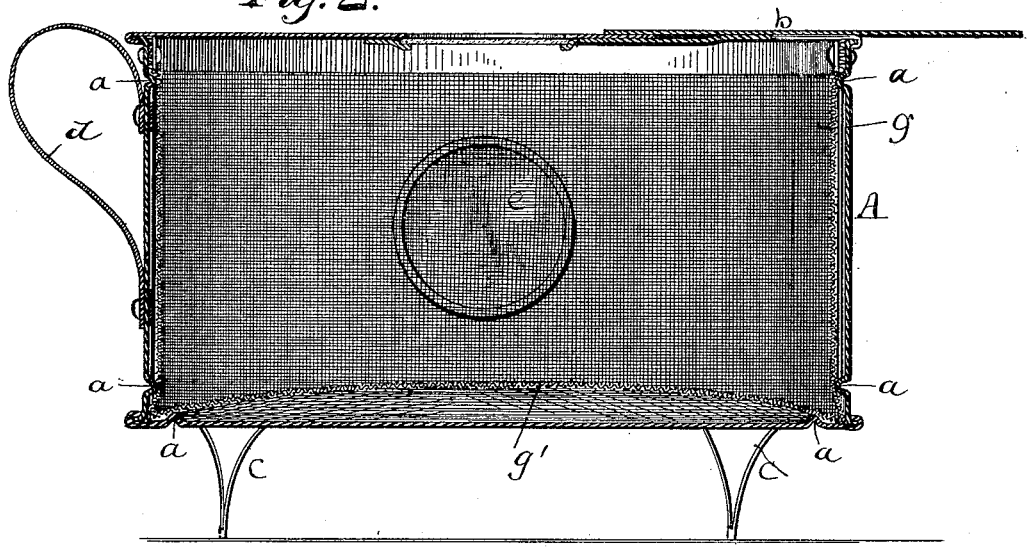
Witnesses:
J. B. McGirr.
Dow E. Felt.
Inventor:
N. A. Durham
By his atty

UNITED STATES PATENT OFFICE.

NEPHTHALI A. DURHAM, OF BENTON, ILLINOIS.

COFFEE-ROASTER.

SPECIFICATION forming part of Letters Patent No. 389,454, dated September 11, 1888.

Application filed September 19, 1887. Serial No. 250,078. (No model.)

*To all whom it may concern:*

Be it known that I, NEPHTHALI A. DURHAM, of Benton, Franklin county, Illinois, have invented new and useful Improvements in Coffee-Roasters; and I do hereby declare that the following is a full and accurate description of the same, reference being had to the accompanying drawings, wherein—

Figure 1 is a perspective view of my roaster. Fig. 2 is a longitudinal section of the same.

In roasting coffee it has been customary to place the raw berries in a receptacle under which a fire is placed, and to prevent overheating by agitating the berries. This agitation is made necessary by the close proximity of the fire, and it results in a very considerable waste in the volatile essence of the coffee. To avoid such loss it is desirable, first, to subject the mass in the roaster to a uniform temperature throughout without agitation; and, second, to fill the receptacle full, and thereby exclude the atmospheric air to the greatest possible extent, because unless the volatile matter of the berry can escape there will be a resistance to its evolution, and being retained within the berry during the process of roasting it will become to a large extent locked in again when the roasting has been completed and the berries permitted to cool.

I am aware that a roaster has been constructed designed to be placed in a hot chamber, as in the oven of a stove, and thereby subjected to practically uniform heat on all sides; but I think it desirable to secure a still more uniform distribution of the heat by interposing between the berries and the wall of the receptacle a thin non-conducting or imperfectly-conducting layer.

My invention therefore consists in a close roasting chamber or vessel of sheet metal having within it means—such as fixed wire-gauze partitions secured to its sides and bottom at a distance therefrom—for interposing between the wall of said vessel and the coffee-berries a non-conducting or imperfect heat-conducting stratum or layer; and it also consists in a roaster having walls transparent to a larger or smaller extent, whereby the progress of the roast can be observed without uncovering the hot berries. By this latter means the berries may remain tightly sealed up from the time when they are placed in the roaster until after they have been roasted and have become cool again.

Coffee may be roasted in one of my roasters with complete uniformity and to any degree desired and without sending into the apartment any smoke or odor whatever.

A is a vessel made of sheet metal joined at the edges in some usual and proper way, or, if preferred, made seamless. This last way will, however, be more expensive without any material benefit.

The vessel A may be circular or angular in shape. A small tight-fitting cover, *b*, closes the opening through which coffee enters or is discharged. The legs *c* support the vessel away from the bottom of the oven or other hot surface on which the roaster stands, and a handle, *d*, serves to grasp the vessel by when it is to be moved. In the top, and at suitable places on sides, and also on bottom, if desired, the transparent panels *e e* are inserted. These panels may be made of glass; but mica may be employed to avoid danger of accidental breakage. The whole wall can be made of transparent material; but as such material is less efficient as heat-conductor than sheet metal, as well as more liable to accidental breakage, it is less desirable than metal for ordinary use. The layer or stratum of imperfect conductor may be made of some proper material—such as asbestus, sand, or air. For convenience and economy I prefer the latter, and I secure a proper stratum of air by employment of a lining, *g*, of wire-gauze attached properly to the walls A, so as to be maintained at a proper distance therefrom. This distance need not exceed from an eighth to a quarter of an inch. The coffee-berries are thereby prevented from touching the external wall of A, and therefore the heat by which the coffee is roasted is radiant heat instead of heat transmitted by contact, and is not only less intense, but is more uniformly distributed.

The gauze is maintained at the desired distance from the walls of the vessel A by internal projections, *a*. Preferably the latter consist of ribs formed by bending or creasing said walls inwardly. I also give to the bottom piece, *g'*, of the gauze an arched form, so as to sustain the coffee above the bottom without the necessity of central supports or ribs for said piece.

Having described my invention, I claim—

In a coffee-roaster, the combination, with the sheet-metal body A, bent inward to form the inwardly-projecting ribs $a$, and provided with the legs $c$, for holding said body above the bottom of the oven, of the close-fitting cover and the wire-gauze lining $g$, supported above the bottom and at a distance from the sides of the body by said ribs, substantially as and for the purposes described.

NEPHTHALI A. DURHAM.

Witnesses:
T. S. BROWNING,
WM. F. SPILLER.